(12) United States Patent
Weitbruch et al.

(10) Patent No.: US 7,312,767 B2
(45) Date of Patent: Dec. 25, 2007

(54) METHOD AND DEVICE FOR COMPENSATING BURN-IN EFFECTS ON DISPLAY PANELS

(75) Inventors: Sébastien Weitbruch, Mönchweiler (DE); Axel Goetzke, Villingen-Schwenningen (DE); Rainer Zwing, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 230 days.

(21) Appl. No.: 10/481,302

(22) PCT Filed: Jun. 15, 2002

(86) PCT No.: PCT/EP02/06621

§ 371 (c)(1),
(2), (4) Date: Dec. 19, 2003

(87) PCT Pub. No.: WO03/003336

PCT Pub. Date: Jan. 9, 2003

(65) Prior Publication Data

US 2004/0165064 A1    Aug. 26, 2004

(30) Foreign Application Priority Data

Jun. 27, 2001    (EP)    ................... 01115422

(51) Int. Cl.
*G09G 3/28*    (2006.01)
*G09G 5/00*    (2006.01)
(52) U.S. Cl. ........................ 345/60; 345/204
(58) Field of Classification Search ............... 345/204, 345/55, 60–72, 76, 87; 315/169.1–169.4; 348/173
See application file for complete search history.

(56) References Cited

U.S. PATENT DOCUMENTS

| | | | |
|---|---|---|---|
| 5,119,084 A * | 6/1992 | Kawamura et al. | 345/98 |
| 5,486,871 A * | 1/1996 | Filliman et al. | 348/558 |
| 6,392,616 B1* | 5/2002 | Suzuki et al. | 345/60 |
| 6,452,579 B1* | 9/2002 | Itoh et al. | 345/100 |
| 6,778,159 B1* | 8/2004 | Yamazaki et al. | 345/89 |
| 2001/0011979 A1* | 8/2001 | Hasegawa et al. | 345/87 |
| 2002/0005823 A1* | 1/2002 | Shigeta et al. | 345/67 |

FOREIGN PATENT DOCUMENTS

| | | |
|---|---|---|
| EP | 1094434 A1 | 4/2001 |
| JP | 11024041 | 1/1999 |
| JP | 11175022 | 7/1999 |

OTHER PUBLICATIONS

Search Report.

* cited by examiner

*Primary Examiner*—Amr A. Awad
*Assistant Examiner*—Stephen Sherman
(74) *Attorney, Agent, or Firm*—Joseph J. Laks; Robert B. Levy

(57) ABSTRACT

Phosphor based display technologies show artefacts like "sticking" or "ghost" images produced by "marking" or "burn-in" effects. In order to remove these artefacts, it is proposed to activate a portion of the display screen as a wiper and to move the wiper at least one time over the complete display screen or a part of the display screen. The wiper will homogenize the complete video screen in order to make the ghost images less visible. Another embodiment is dedicated to the reduction of the short-term burning effect. Here, a dynamic correction of the displayed picture is done. A memorized picture could be subtracted from the current picture in order to reduce the visibility of the short term sticking effect.

20 Claims, 9 Drawing Sheets

METHOD AND DEVICE FOR COMPENSATING BURN-IN EFFECTS ON DISPLAY PANELS

This application claims the benefit under 35 U.S.C. § 365 of International Application PCT/EP02/06621, filed Jun. 15, 2002, which claims the benefit of European Patent Application No. 01115422.6, filed Jun. 27, 2001.

FIELD OF THE INVENTION

The present invention relates to a method and device for compensating burn-in effects on a display screen. Furthermore, the present invention relates to a method and device for processing video pictures for displaying at least a series of a first picture and a second picture on a display screen.

BACKGROUND OF THE INVENTION

As the old standard TV technology (CRT) has nearly reached its limits, some new display technologies (LCD, PDP, . . . ) are encountering a growing interest from manufacturers. Indeed, these technologies now make it possible to achieve true flat displays with very limited depth.

Referring to the last generation of European TV, a lot of work has been made to improve its picture quality. Consequently, the new technologies have to provide a picture quality as good or better than standard TV technology. On the one hand, these new technologies allow to produce flat screens, of really attractive thickness, but on the other hand, they generate new kinds of artefacts, which could reduce the picture quality. Most of these artefacts are different as for CRT-TV pictures and so more visible since people are used to seeing the old TV artefacts unconsciously.

One of these new artefacts are "sticking" or "ghost" images due to the "marking" or "burn-in" effect. This effect is generated by a change of the panel behaviour depending on the time a specific picture has been displayed. In other words, if a picture has been displayed a long time on a screen, the picture will stay visible as a shadow on every other scene: this is called "ghost" image. As an example, if a black picture with white text is displayed on a screen during a significant time, the text will be readable on another scene later. This affects different display technologies like CRT and PDP in different ways. In the case of the plasma display technology, this effect is quite strong and leads to very disturbing artefacts. These effects are very critical for all professional applications (notice board . . . ) displaying a lot of static pictures as well as consumer applications (PC images, digital photo, etc.).

A PDP utilizes a matrix array of discharge cells which can only be "ON" or "OFF". Also unlike a CRT or LCD in which gray levels are expressed by analog control of the light emission, a PDP controls the gray level by modulating the number of light pulses per frame (sustain pulses). The eye will integrate this time-modulation over a period corresponding to the eye time response. To perform a grayscale rendition, the Plasma display is commonly divided in sub-lighting periods called sub-fields each one corresponding to a bit of the input video picture data. For instance, if 8 bit luminance levels are provided, in that case each level will be represented by a combination of the 8 following bits :

1-2-4-8-16-32-64-128.

To realize such a coding with the PDP technology, the frame period will be divided in 8 lighting periods (called sub-fields), each one corresponding to a bit. The number of light pulses for the bit "2" is the double as for the bit "1", and so forth. With these 8 sub-periods, we are able through sub-field combination, to build the 256 gray levels. A simple sub-field organisation is shown in FIG. 1.

For clarification, a definition of the term sub-field is given here: A sub-field is a period of time in which successively the following is being done with a cell:

1. There is a writing/addressing period in which the cell is either brought to an excited state with a high voltage or left in its neutral state with lower voltage.
2. There is a sustain period in which a gas discharge is made with short voltage pulses which lead to corresponding short lighting pulses. Of course only the cells previously excited will produce lighting pulses. There will not be a gas discharge in the cells in neutral state.
3. There is an erasing period in which the charge of the cells is quenched.

In some specific plasma driving schemes (incremental coding, e.g. the CLEAR concept announced by Pioneer) the addressing or erasing periods are not present in each sub-field. Instead, a selective addressing/erasing is performed ahead or after a group of sub-fields.

Often, more sub-fields are used to reduce moving artifacts and "priming" could be used on more sub-fields to increase the response fidelity. Priming is a separate optional period, where the cells are charged and erased. This charge can lead to a small discharge, i.e. can create background light, which is in principle unwanted. After the priming period an erase period follows for immediately quenching the charge. This is required for the following sub-field periods, where the cells need to be addressed again. So priming is a period, which facilitates the following addressing periods, i.e. it improves the efficiency of the writing stage by regularly exciting all cells simultaneously.

On a PDP, two kinds of ghost images are existing:

"Short term burning": this ghost image (3 to 5% of its original brightness) is mainly a positive image ("burned" cells are brighter than others) which will disappear after a short time (some minutes up to some hours). The origin is not completely clear yet but it seems that this effect is related to some kind of charges which have been accumulated during the time a cell stays ON. Later these charges improve the luminance emitted by the cell even if only priming is active in the frame period. An example of this effect is shown in FIG. 2, where a static menu is displayed during some minutes and afterwards a "ghost" menu is visible on the next scene as a positive image.

"Long term burning": this stable sticking image is a negative image ("burned" cells are darker than others) related to a kind of aging of the plasma cell. The cumulative amplitude can go up to 50% loss of luminance. This effect is illustrated in FIG. 3, where the static menu is displayed during some hours and then a "ghost" menu is visible on the next scene as a negative image.

The long term burning is the more critical issue since this effect is not reversible and could reach 50% luminance loss. This effect is linked to a kind of aging of the PDP represented in FIG. 4. At the beginning of the PDP lifetime, the aging process is quite strong and leads quickly to disturbing ghost images above all for professional applications using static pictures. Later this process will decrease.

In the case of the CRT technology, this effect is really an issue for PC monitors which dispose today of a screen saver in order to prevent a strong marking of the screen.

Numerous PDP manufacturers are trying to modify the technology in order to avoid this problem (gas mixing, MgO layer thickness, cell geometry) but up to now, no real improvement has been announced.

One approach is to use a kind of jittering in picture position on professional PDPs. Thereby the picture is regularly translated a bit in all directions. This will lead to less sharpness of the ghost image but it still exists.

Another approach is to invert the static pictures in order to burn the entire PDP panel in the same way. This requires to know the picture content and this method is strongly limited by the power limitation of the panel.

SUMMARY OF THE INVENTION

In view of that it is the object of the present invention to homogenize the panel behaviour in order to reduce the visibility of ghost images.

According to the present invention this object is solved by methods according to claims 1 and 5 as well as devices according to claims 12 and 15.

According to one aspect of the invention, a specific dynamic solution enabling to reduce the visibility of short-term burning effect in real time will be possible. Here, a correction picture is calculated on the basis of at least one preceding picture being made responsible for a short-term burning effect and the correction picture will be combined with a current picture, the combined picture will be displayed for reducing ghost images resulting from the at least one preceding picture.

Another aspect of the invention concerns the general idea to employ a kind of "wiper" based on a very luminous small picture scanning the whole screen from time to time. The "wiper" can be used e.g. as a screen saver or during the switching OFF/ON of a display screen. This principle may be used for the two sticking effects in the following way:

"Short term burning": the solution aims at generating the same quantity of charges in all the cells of the panel during a refreshing time. After that, all the cells will have the same behaviour.

"Long term burning": the solution aims at aging all the cells during a refreshing time with the assumption that the "burned" ones will not be aged as quick as the other. This will lead to a reduction of the difference between the two types of cells. In addition, this method could be used for a pre-aging of the panel in order to bring the panel in a status where the aging process is no more an issue. This last method could be very appreciable for all professional displays (not consumer ones).

For these two concepts, the refreshing time can be a time slot included in the working time like a screen saver on a PC but it can also be used during the switching OFF process or during the non-working time.

One of the main issues is to use a specific small pattern with very few sub-fields in order to dispose of more energy, which will scan the whole screen.

In summary, the different embodiments of the present invention show the following advantages:

A regular removal of "ghost images" produced by "short-term" or "long-term" burning from the PDP is enabled by a "wiper function".

For the simple "wiper" function (no picture-dependent) there is virtually no extra costs added.

The computation of a picture adaptive wiper is possible (manually or automatically).

A further specific "short-term" picture pre-correction can prevent the visibility of the "ghost-images" during the standard functioning of the PDP. This solution can be designed so that even if the priming of the PDP is affected by the "short-term" burning problem a homogenisation is possible.

A combination with a simple letterbox detector algorithm will further permit to reduce the problem of short-term burn-in and long term burn-in.

All these solution can be implemented so that only the video level values are affected, which means that they can be used for any display technology with similar burning problem.

BRIEF DESCRIPTION OF THE DRAWINGS

Exemplary embodiments of the invention are illustrated in the drawings and are explained in more detail in the following description.

In the drawings.

DETAILED DESCRIPTION

In the following the present invention will be explained along with several exemplary embodiments.

Figure 1:
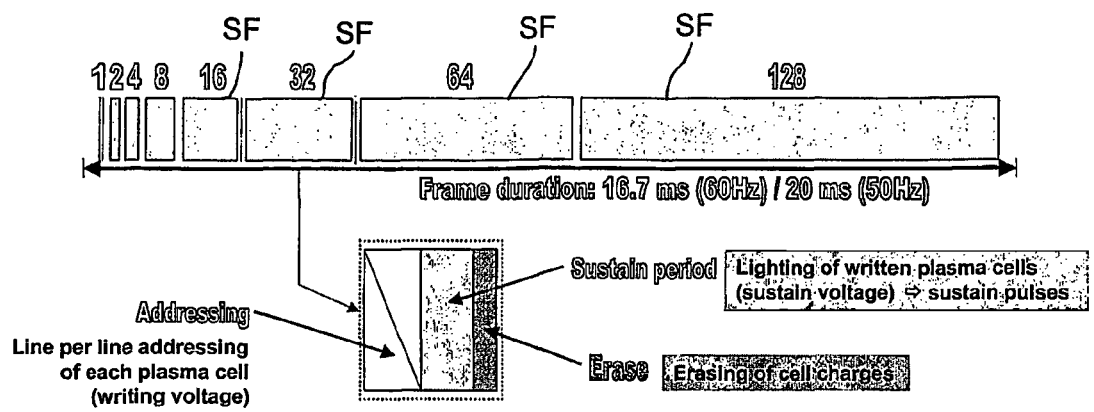
FIG. 1 shows the conventional ADS addressing scheme during a frame period.
Figure 2:
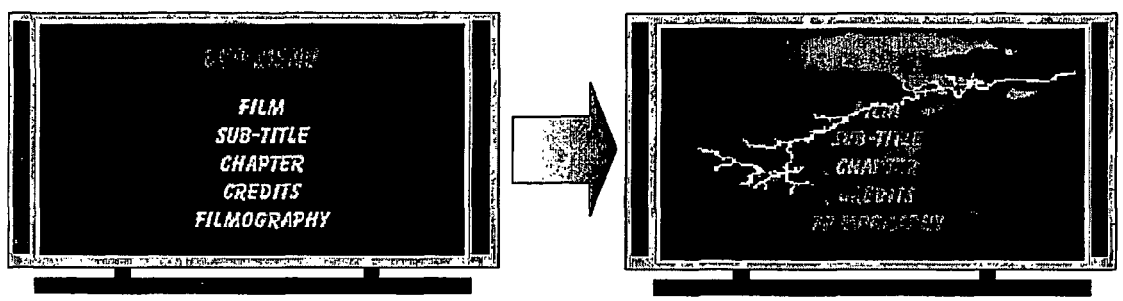
FIG. 2 shows an example of "short term burn-in"
Figure 3:
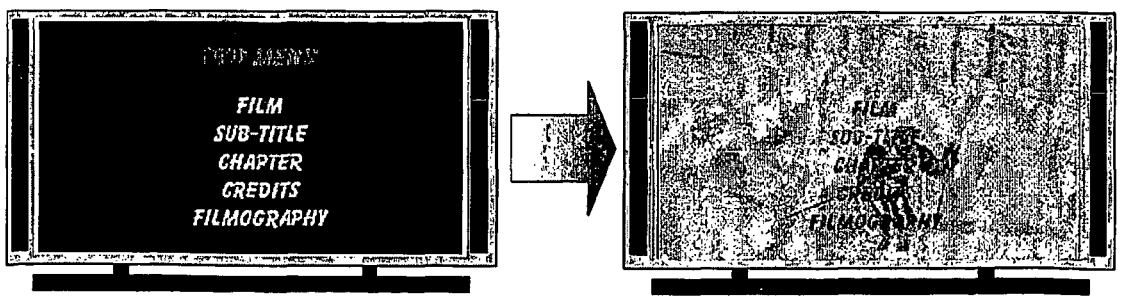
FIG. 3 shows an example of "long term burn-in"
Figure 4:
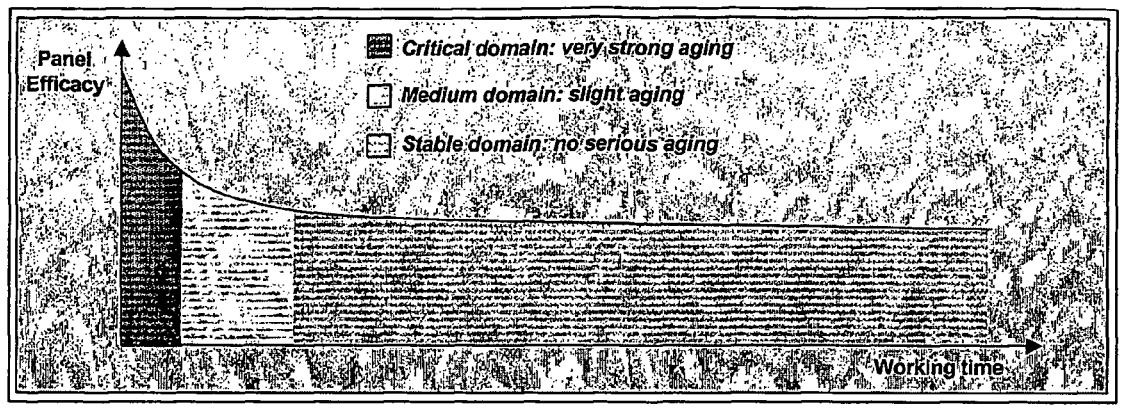
FIG. 4 shows a plasma display panel aging process.
Figure 5:
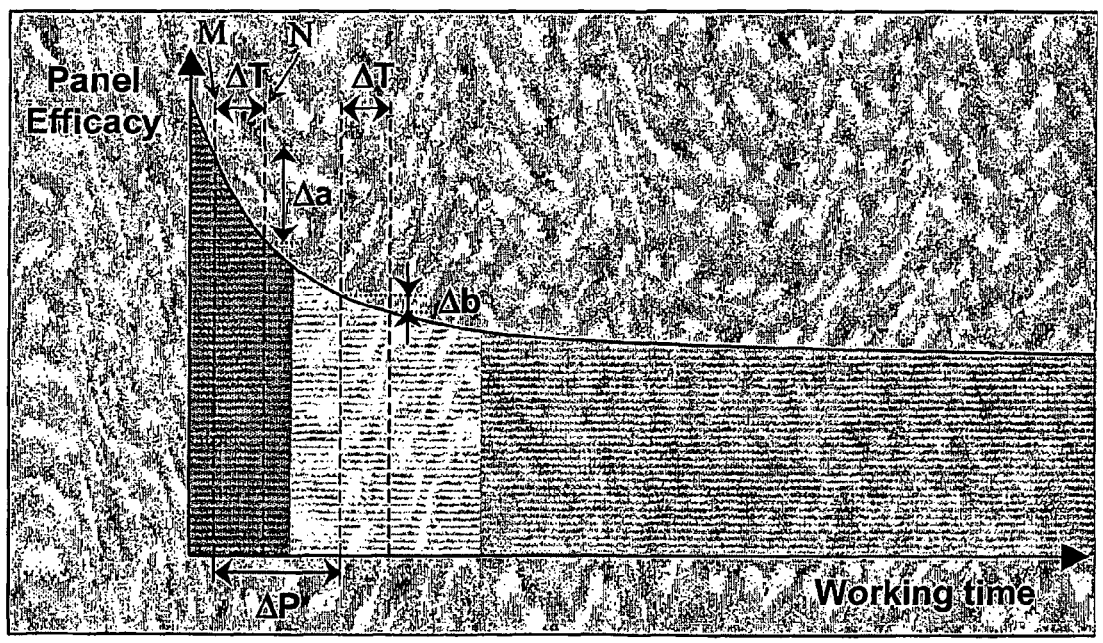
FIG. 5 shows a "long-term ghost image" reduction by artificial aging of the panel.

The curve from FIG. 4 shows that an aged cell will evolve slower than a non-aged cell. In other words, by an artificial aging of the whole panel one can reduce strongly the difference between aged cells and non-aged cells. This is illustrated in FIG. 5 in the case of two cells (M, N) having a difference in aging time of $\Delta T$. FIG. 5 shows that the difference Aa in efficacy between two cells having a is different aging time $\Delta T$ decreases to a value $\Delta b$ by an overall aging of the panel during $\Delta P$. This has an influence on the so-called "long-term burn-in". In the case of the "short-term burn-in", an overall excitation of all cells will homogenize the charges leading to a disappearing of any "short-term ghost image". This overall excitation may be generally realized by a PDP activation in the form of a moving wiper.

The main idea of the PDP activation in the form of a wiper is to homogenize the PDP by using a specific pattern (artificial aging, charges homogenisation) preferably with the following features:

High luminance pattern to achieve quickly such a homogenisation process. This luminance should be higher than the strongest luminance normally displayed on the panel. For that purpose less sub-fields are used (e.g. only one sub-field) so that less addressing time is lost.

Small wiper size to avoid a power overloading when strong luminance is emitted.

Periodical scanning of the whole screen to achieve a good homogeneity. The speed of the scanning should depend on the panel technology.

Different usage possibilities:
1. Used as screen saver regularly during a short-time
2. Used outside the main working time (e.g. during the night)
3. Used during each switching OFF/ON of the panel.

There are in fact three main purposes for using this functionality:
1. In order to homogenize the charges in each cell for reducing the "ghost images" coming from the "short-term burning" during the use of the panel.
2. In order to homogenize the aging of the panel for reducing the "ghost images" coming from the "long-term burning" during the use of the panel.
3. In order to pre-burn the whole panel before selling it. The idea is to go quickly outside the critical domain shown in FIG. 4.

Figure 6:
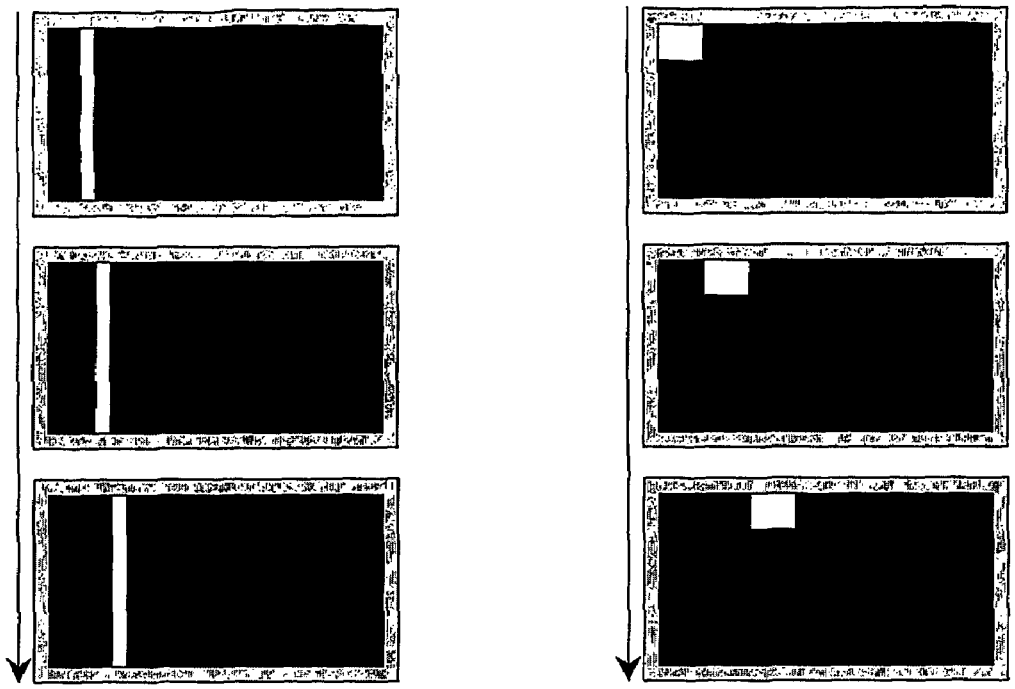
FIG. 6 shows two examples of possible wiper shapes.

FIG. 6 illustrates two possible wipers and the corresponding scanning process. The left column indicates the scanning of a complete screen by a vertical wiper and the right column illustrates the scanning with a square wiper. Multiple other different shapes of the wiper can be used alternatively. As depicted, all pixels that are activated with the wiper have the same luminance level. The wipers having this characteristic will be called homogenous wiper or general wiper hereinafter.

The problem encountered in such general wipers is a global reduction of the panel efficacy in order to reduce the visibility of the "ghost images".

In fact, if the burned cells of the panel have achieved an efficacy B lower than the efficacy A of the other cells, all cell efficacies will be generally reduced in order to reduce the difference |A−B| to |(A−Δa)−(B−Δb)|. In this formula, Δa (res. Δb) represents the new loss of luminance of the cell A (res. B) obtained by an overall aging of the panel. The solution is based on the fact that Δa>Δb.

Another solution, called picture based wipers, is to identify the cell A and to age all other cells up to the level A. In that case, the global aging of the panel will not go below A. For this solution two possibilities of implementation are disclosed:

When the burn-in pattern is well known (case of professional application), this can be inverted and used for generating a specific wiper.

A burn-in pattern can be computed by averaging the displayed pictures.

Figure 7:
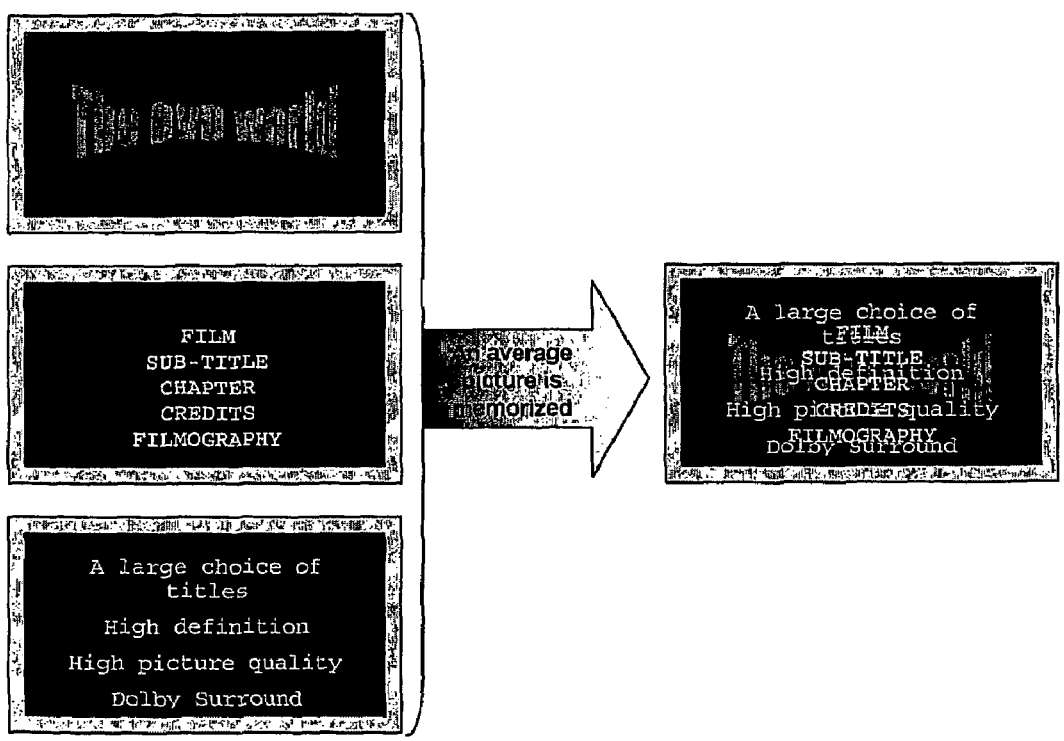
FIG. 7 shows a computation of an average burning picture.

According to the first possibility for professional applications based on known static picture(s) a new function can be added in the PDP giving the possibility to memorize one picture when only one picture is responsible of the "long term burn-in". If more pictures are responsible, this function will sum up a certain number of pictures in order to dispose of the burning picture. When summing up the video levels for corresponding pixels, the maximum possible video level will not be exceeded. E.g. if the video levels 255 and 250 are summed up, the resulting value is not 505 but remains 255 in case of 8 bit video level numbers. The procedure of summing up different video picture to get the burning picture is illustrated in FIG. 7.

Figure 8:
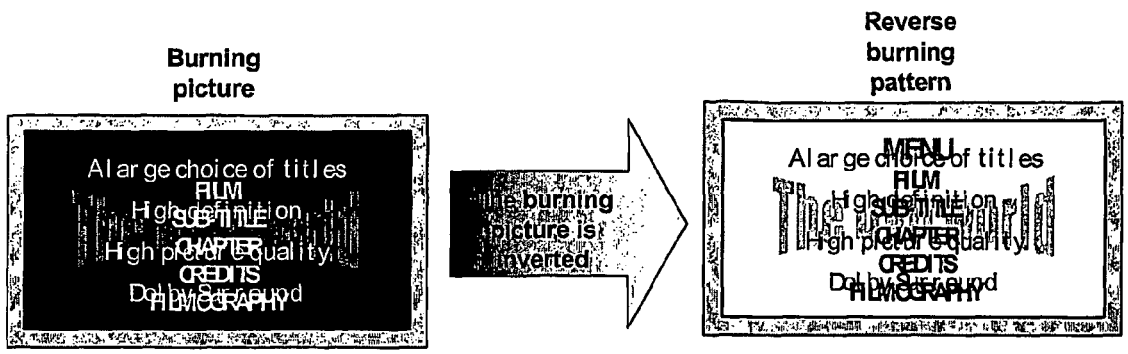
FIG. 8 shows a computation of a reverse burning pattern.

Based on this resulting burning picture, an inverted picture can be computed as shown in FIG. 8 or in case of a single original picture it can be immediately inverted. The picture leading to a "ghost image" will be inverted in order to dispose of a new picture that will be displayed on the panel for an artificial aging of the panel. The idea is to age only the cells A of the panel.

The disadvantage of the former solution according to FIG. 8 is mainly a problem of power supply. In the example, the burning picture is a black picture with white text. This picture requires less power and can be displayed with a strong white luminance leading to a good contrast but also to a quick aging of the panel. The reverse picture is a white one with only few black text, that requires a lot of power. Consequently this picture can only be displayed with reduced white luminance and this makes the artificial aging of the panel quite slow.

A wiper based on the reverse picture will drastically enhance (i.e. accelerate) the whole process of homogenisation. This concept can be accompanied by one or more of the following characteristics for an optimisation:

Use of a higher number of sustain pulses for the video levels to achieve quickly such a homogenisation process. The luminance should be higher than the strongest luminance normally displayed on the panel. For that purpose less sub-fields are used (e. g. only one, two or three sub-fields are used).

Use of a small sized wiper to avoid a power overloading when strong luminance is emitted.

Periodical scanning of the whole screen to achieve a good homogeneity. The speed of the scanning should depend on the panel technology.

In other words only a small part of the reversed picture will be displayed in order to scan the whole PDP screen under different forms of wipers (vertical area, square area). The idea is to use only few sub-fields since there is no need to display a high quality picture but only strong luminance in order to very quickly reverse the "ghost image".

Figure 9:
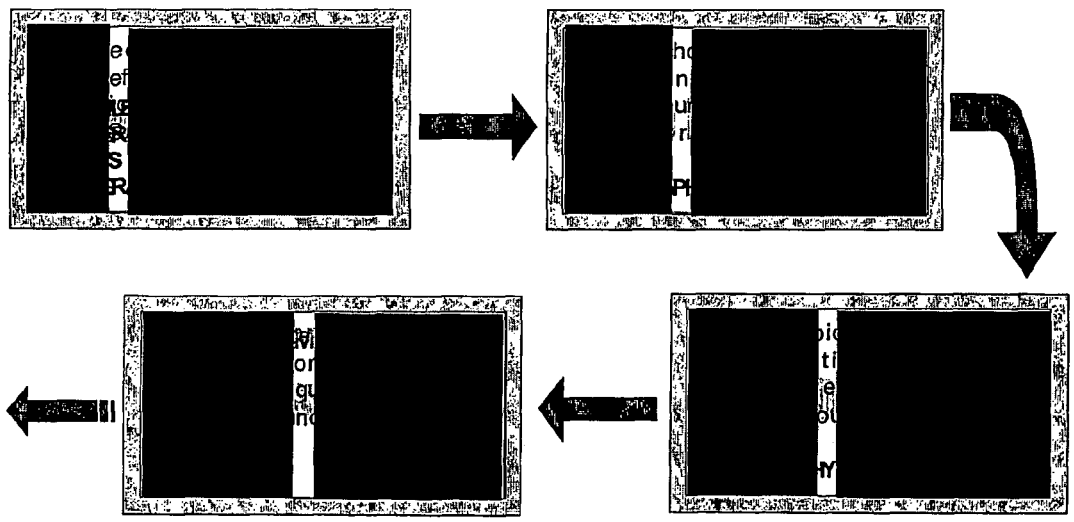
FIG. 9 shows a picture dependent "vertical" wiper concept.

FIG. 9 illustrates such a wiper concept. Obviously, any kind of wiper form can be defined; the main idea is to use only a a relatively small area wiper that regularly scans the whole screen.

According to the second possibility of global aging based on unknown displayed picture(s) a new function can be added in the PDP giving the possibility to memorize an average picture which is generally responsible of an aging of the panel.

Figure 10:
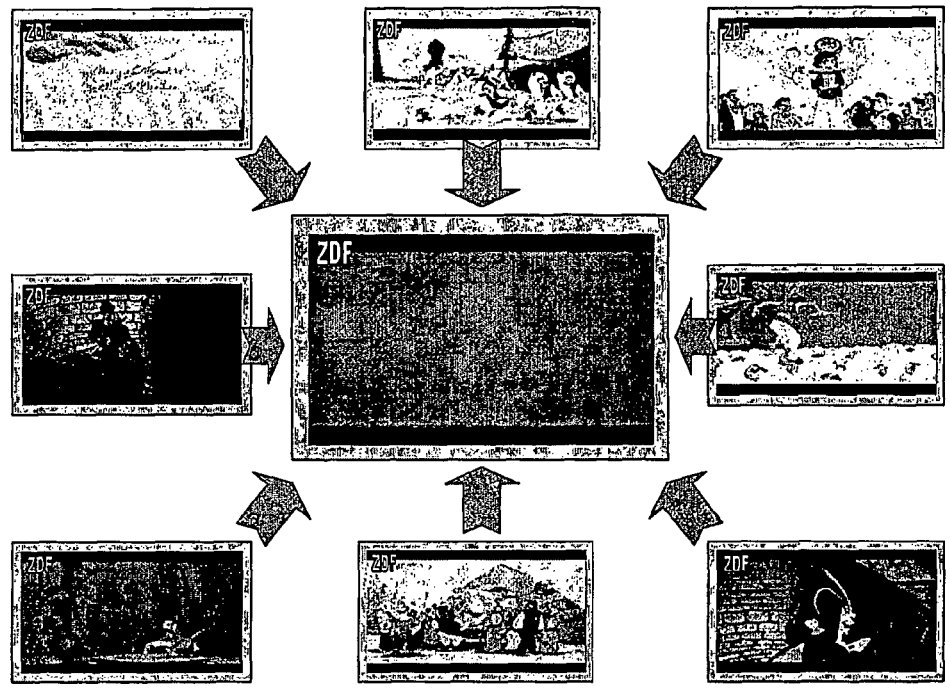
FIG. 10 shows an example of picture averaging.
Figure 11:
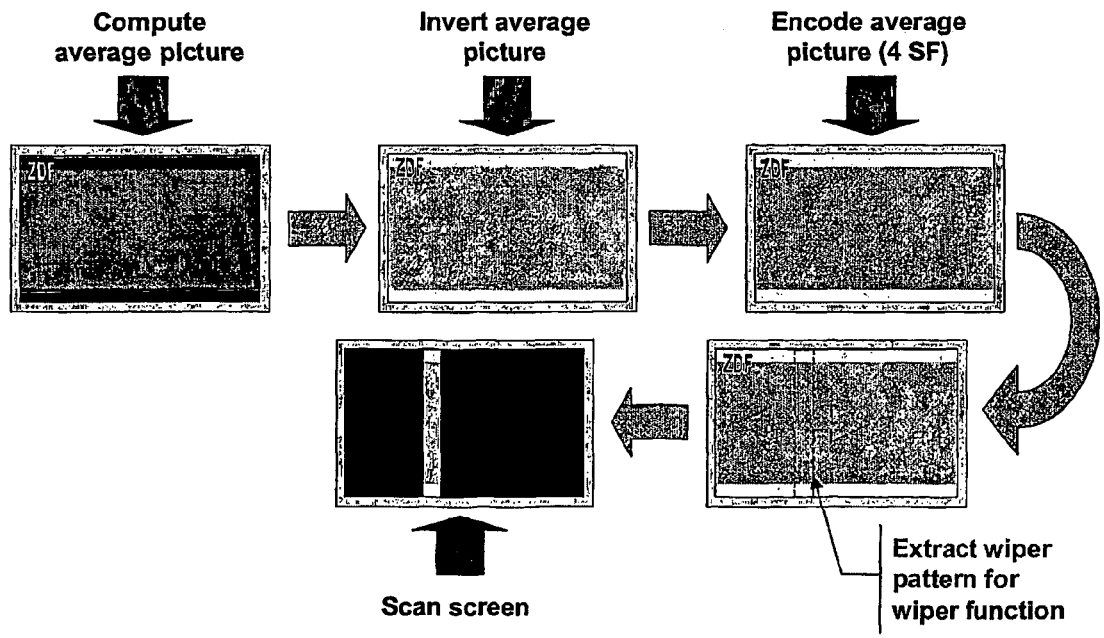
FIG. 11 shows an automatic picture dependent wiper function.

Assuming a user who regularly watches some cinemascope films. Even on a 16:9 screen there are still black boxes at the top and at the bottom of the screen. These parts of the screen will never be used and will have a better efficacy than the rest. In that case, the concept of generating an average picture can be seen in FIG. 10, which gives an example of the averaging of different cinemascope pictures (2:1 format). Each pixel of the computed picture can be seen as an average in the time of all the video values displayed at its location. This picture will then be inverted and coded with few sub-fields (e.g. 4 sub-fields SF) to define the new pattern of the wiper function. This is illustrated in FIG. 11.

The method described in the last example gives the possibility to reverse the letterbox (black bars) burning. The principle is the same as described in the previous embodiment, here the picture is not statically memorized but dynamically computed. An important further aspect of this method is the post-correction of the inverted average picture. If the minimum video value (over all colours RGB) of the inverted average picture is not Zero but a value M, the picture should be reduced from M. Preferably in the areas where full white values or nearly full white values are given in the reversed picture, no reduction by the value M should be made. Obviously, there is really no need to burn the complete panel down but only the non aged cells. The post correction helps to achieve this. In that case, if a cleaning stage should be started after a time T, the new PDP function has computed an average picture during the time T, that will be inverted and post-corrected, then coded with few sub-fields for each colour in order to determine the wiper pattern. The main idea is still to use a small sized wiper encoded with only few sub-fields to achieve a quick cleaning of the screen. Finally, the complete processing could be described as following:

$$AveragePicture(x, y, T) = \frac{1}{T} \sum_{t \in [0;T]} Picture(x, y, t)$$

$$InvertedPicture(x, y, T) = 255 - AveragePicture(x, y, T)$$

$$M = \min_{x,y,R,G,B}(InvertedPicture(x, y, T))$$

$$InvertedPicture'(x, y, T) = InvertedPicture(x, y, T) - M \text{@whitebars}$$

$$InvertedPicture''(SF(x, y),T) = Encoding(InvertedPicture'(x, y, T))$$

$$Wiper_n(SF(x, y),T) = SubPart(n, InvertedPicture''(SF(x, y),T))$$

In the above described process, n stands for the step number during wiper movement and x,y are the pixel coordinates. The function for obtaining the AveragePicture may be varied by selecting only specific pictures or using weighting functions or using a different average calculation rule that is more easily performed with only one frame memory.

A further feature can be an automatic computation of the cleaning time depending on the working time T. If the peak-white luminance used during the cleaning time is N times stronger (less sub-fields used) than the maximum peak-white available on the PDP in standard use, the cleaning time is at maximum T/N per wiper moving step.

Figure 12:
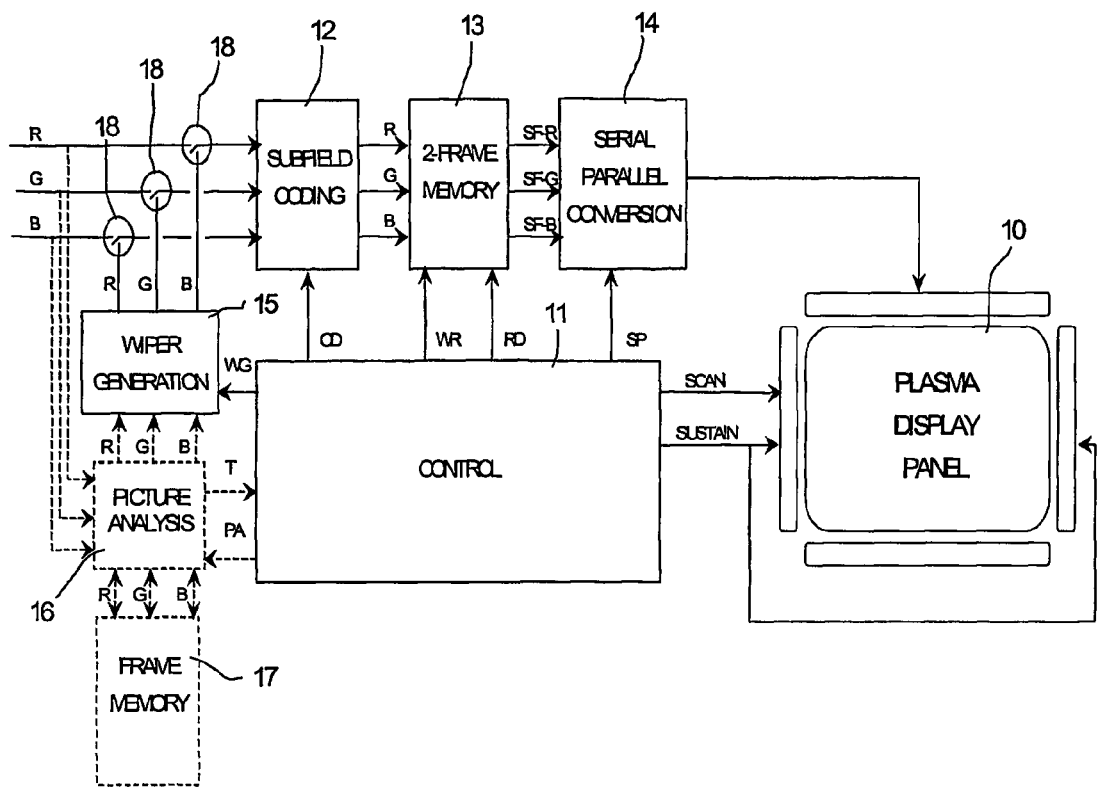
FIG. 12 shows a possible "PDP-wiper" implementation.

There are at least the following four possibilities to activate the wiper:

- As a pre-burning of the panel to go outside the critical aging domain. In that case this feature will be used in the facility/factory before shipping the panel to stores.
- As a screen-saver based on simple patterns (white/black) or based on a picture dependent pattern.
- As a new switching OFF/ON function.
- As some kind of "degauss" function activated by the operator FIG. 12 illustrates a possible circuit implementation of the complete system. Standard input RGB data is replaced by the picture generated in the "WIPER GENERATION" block 15 when the WG control signal is activated by the control unit 11. For this purpose switches 18 are provided that are also controlled by control unit 11 (not shown). The activation of wiper function can be done manually in the user interface menu; this can be also done automatically during switch OFF/ON or in the production mode (available in facilities only).

The compensated R, G and B components are forwarded to a sub-field coding unit 12 that performs sub-field coding under control of control unit 11. The sub-field code words are stored in memory unit 13. The control unit 11 also controls reading and writing from and to this memory unit 13 by means of control signals RD and WR. For plasma display panel addressing, the sub-field code words are read out of the memory device 13 and all the code words for one line are collected in order to create a single very long code word which can be used for the line wise PDP addressing. Please note that non-zero code words are only in the area of the wiper. This is carried out in the serial to parallel conversion unit 14. The control unit 11 generates all scan and sustain pulses for PDP control. It receives horizontal and vertical synchronising signals for reference timing (not shown).

The parts with dashed lines represent the optional aspect of this invention. The "PICTURE ANALYSIS" block 16 is able to memorize a standard picture or to average displayed pictures over a long time. It can be activated by the control signal PA of the control unit 11. It is also able to return the time T corresponding to the averaging time to the control block T. This time T gives the possibility to the CONTROL block to determine the needed "cleaning time". The optional block 16 needs an additional frame memory 17 for the analysing operation. This frame memory holds the average picture in case the averaging feature is implemented. The wiper generation unit 15 accesses this memory 17 for generating the reversed picture for each wiper movement step.

Figure 13:
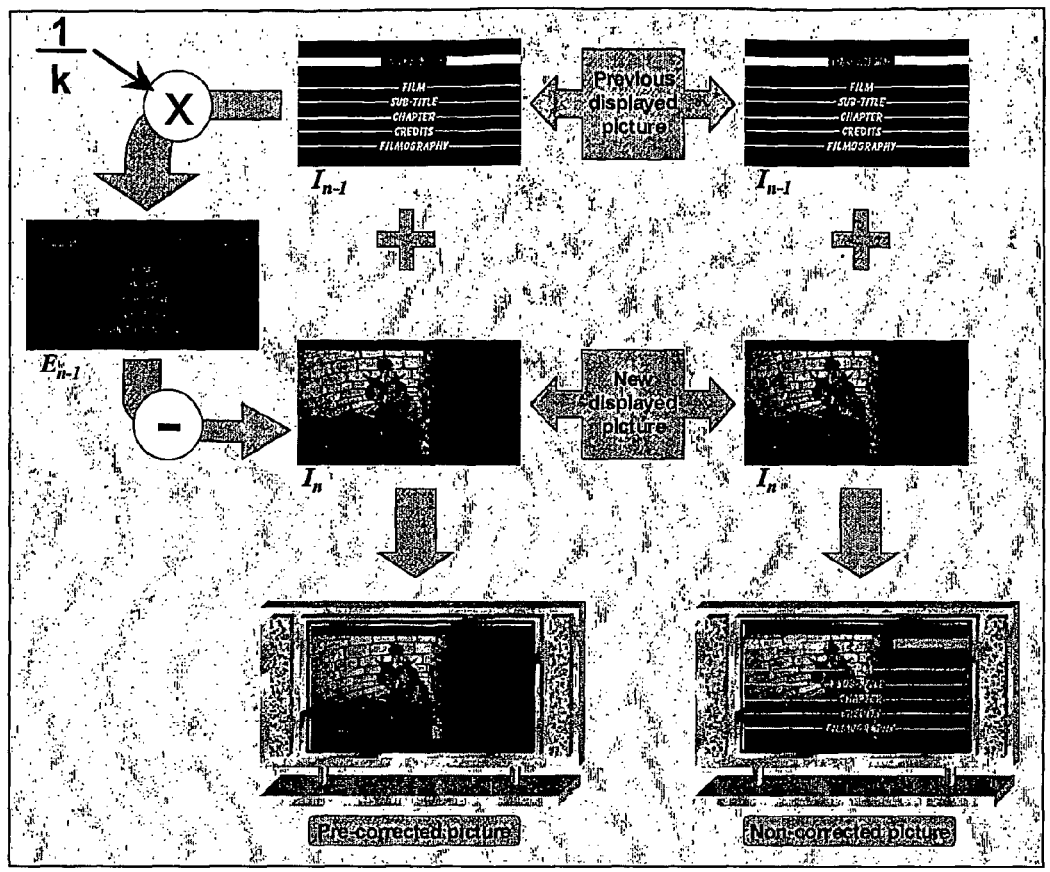
FIG. 13 shows a specific "short-term" pre-correction.

The "short-term burning effect" can be seen as a kind of memory effect of the panel. The previously displayed picture will let an echo on the following ones. The main disturbing aspect of this effect is during a strong change of displayed scenes when the previous picture (menu, title, and logo . . . ) stays visible for a few seconds on the following pictures (film content . . . ). To overcome this an additional possible feature to the wiper concept according to the invention can be an additional dynamic correction of the displayed picture. This means that a "memorized picture" will be subtracted from the current picture in order to reduce the visibility of the short term sticking effect. FIG. 13 illustrates this feature.

The right part of FIG. 13 shows how the new displayed picture could look like if previously a user menu has been displayed during a certain time: an echo of the menu is still visible on the film sequence.

The left part of FIG. 13 shows how the picture could be corrected if the picture of the user menu is memorized and then subtracted from the new displayed picture. In other words the video levels of pixels in the current picture will be reduced by a certain amount at those places, where the previous user menu picture had high luminance levels. Of course, the previous user menu picture can be multiplied with a attenuation factor 1/k before subtraction from the current picture.

A first task within this proposal is the artificial generation of such a "memorized picture". $E_n$ is the memorized picture and $I_n$ the current displayed picture at frame n. The memorized picture should also be related to the previous displayed pictures. For that reason the following recursive computation is proposed. $E_n=f(I_n,E_{n-1})$ in which $f(a,b)$ represents a function simulating the memory effect of the panel responsible of the "short-term" burning. This function can have various aspects depending on the panel behaviour.

For some kind of PDPs, the "short-term" burning does not affect all colours in the same way, thus the function $f$ can have different characteristics for the three colours. An example of such a function is given in the next formula:

$$E_n\begin{pmatrix}E_n^R\\E_n^G\\E_n^B\end{pmatrix}=f(I_n,E_{n-1})=\begin{pmatrix}0.3\times I_n^R+0.2\times E_{n-1}^R\\0.6\times I_n^G+0.4\times E_{n-1}^G\\0.3\times I_n^B+0.2\times E_{n-1}^B\end{pmatrix}.$$

$E_{n-1}$ is the previously memorized picture. The new memorized picture $E_n$ will then be subtracted from the next displayed picture $I_{n+1}$ as following:

$$I'_{n+1}=I_{n+1}-\frac{1}{k}\cdot E_n$$

in which 1/k represents an attenuation factor.

The last formula is based on the assumption that the ghost images produced by the "short-term" burning do not affect the priming of the plasma cells (driving of plasma cells with zero video value, see explanation above). This is not the case for all plasma display types. For those types of PDP's having also a "short-term" burning effect on the priming operation (lighter black in some areas), the method should be a bit different since it is not possible to make the priming darker with video treatment only. In that case the "memorized" picture should be inverted and then added to the current picture as following:

$$I'_{n+1}=I_{n+1}+\frac{1}{k}\cdot(255-E_n).$$

Figure 14:
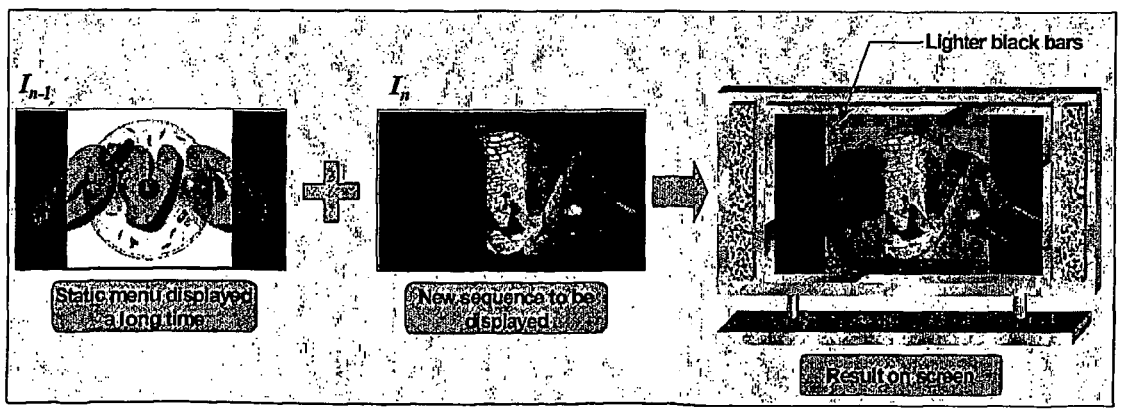
FIG. 14 shows a "short-term" ghost image occuring on the screen even if no video content is displayed and only the priming operation is used.

In that case the whole black levels are made a bit more luminous during some frames. The problem arising from the influence of "short-term burning" on the priming operation of a PDP leading to a disturbing echo of the static menu in the black bars of the following cinemascope pictures is illustrated on FIG. 14.

Figure 15:
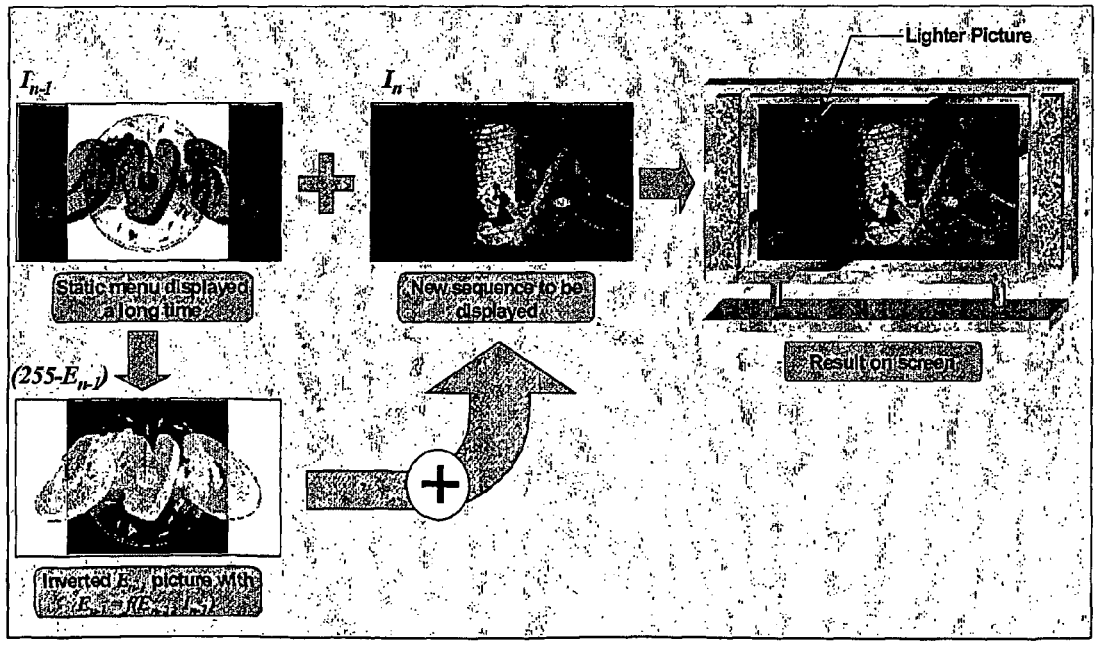
FIG. 15 shows a concept for pre-correction of the "short-term" ghost image depicted in FIG. 14.

FIG. 15 shows the possible correction of such an effect through a raising of the non-affected black levels. Please note that the attenuation of the inverted picture with the factor 1/k is not shown. The figure illustrates the effect of the pre-correction including priming pre-correction. In that case, the average picture black has been raised leading to a reduced contrast but the picture stays homogeneous. In addition, this added level will decrease from frame to frame together with the level of the "ghost image".

Figure 16:
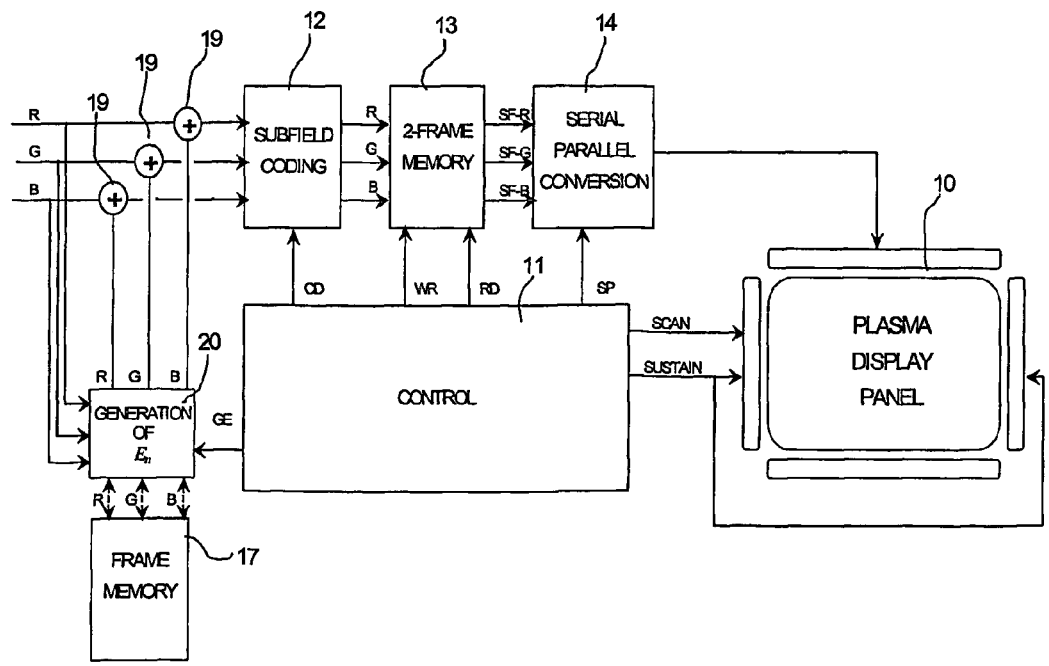
FIG. 16 shows a possible circuit implementation of a "short-term" ghost image pre-correction according to the concept of FIG. 15.

FIG. 16 illustrates a possible circuit implementation of such a feature in a PDP digital board. The reference numbers beeing identical to them shown in FIG. 12 denote the same components and need not be explained again. The generation of the memorized picture $E_n$ and its inversion is performed in the block 20. This block needs a frame memory 21 for its is operation and is activated through the control signal GE via control block 11. If the digital board having this block 20 is used for different panel types, obviously, some additional parameters should be sent via the control block 11 to block 20 in order to modify the function $f(a,b)$ if the PDP behaviour has evolved (new phosphors, new cell geometry, new MgO thickness, new priming waveform . . . ). The generated picture En will then be added or subtracted from the input picture. Corresponding adders 19 are shown in FIG. 16. The component 19 can include both, an adder and subtractor that will be selected by the control unit 11 in order to switch the operation mode.

Figure 17:
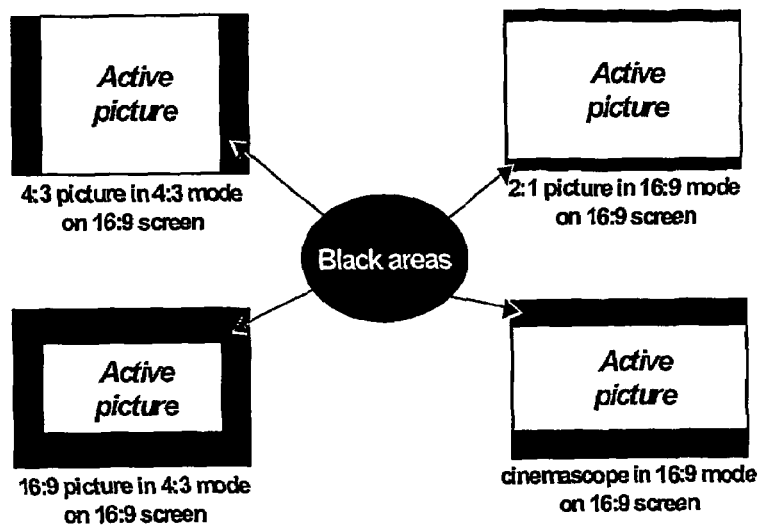
FIG. 17 shows different positionings of black areas in a picture.

Generally, when a picture has not been displayed on the full screen, a marking effect will appear since the rest of the screen (called "black bars") has not been used (no charges accumulated, no aging of such areas . . . ). FIG. 17 illustrates some possible examples. All the black areas represented in FIG. 17 will not be affected by the short-term or long-term burning effect and for that reason, the screen will lose its homogeneity.

In order to tackle this specific problem, a letterbox detector can be used and the black area can be specifically treated. An example of a letterbox detector is known from a European patent application of the applicant described in EP-A-0 913 994. For the disclosure of this embodiment it is therefore expressively reffered to that document. The algorithm disclosed therein provides the precise format of the input picture (first active line, last active line). The plasma control unit 11 then also knows the exact format of the input picture and knows e.g. the performed zoom on the screen. This gives the possibility to activate specific countermeasures:

The black areas could be replaced by an average video level (e.g. 128) during the displaying. This should then avoid strong differences between active areas and "black/gray" areas. This solution is based on the fact that, the displaying of a lot of different scenes in the active region is comparable in terms of energy to the displaying of an average video level. This solution is shown FIG. 18.

Since the PDP control circuit knows at any time the format of the active picture (letterbox circuit output) it is possible, when the format changes, to modify the video level in the former black areas to suppress the short term marking. The video levels for pixels in the former black areas need to be raised for homogenisation. This solution is shown FIG. 19.

Figure 19:
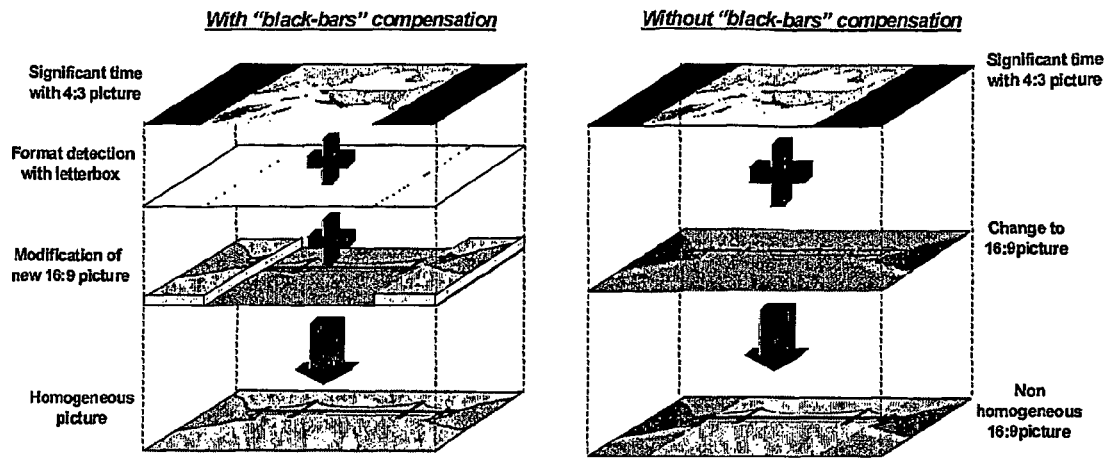
FIG. 19 shows a format adapted "short-term" pre-correction.

In the algorithm presented in FIG. 19, some part of the new 16:9 image have been raised in order to anticipate the short-term effect coming from the previous 4:3 displaying. This can be done by multiplying all video levels for the pixels being positioned on the screen on a place, where previously a black bar was shown with a correction factor or adding an offset value to these video levels. The level on this correction and its duration will depend of the panel technology and the displaying time of the previous format.

Figure 18:
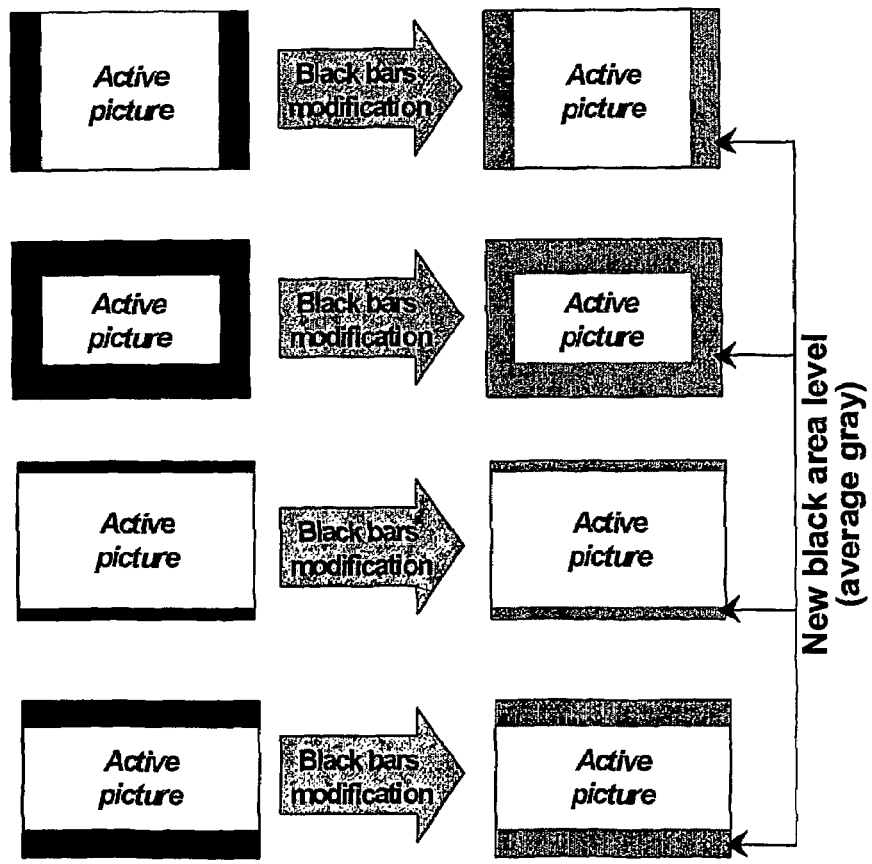
FIG. 18 shows a format adapted change of the average grey-level of black-bars.
Figure 20:
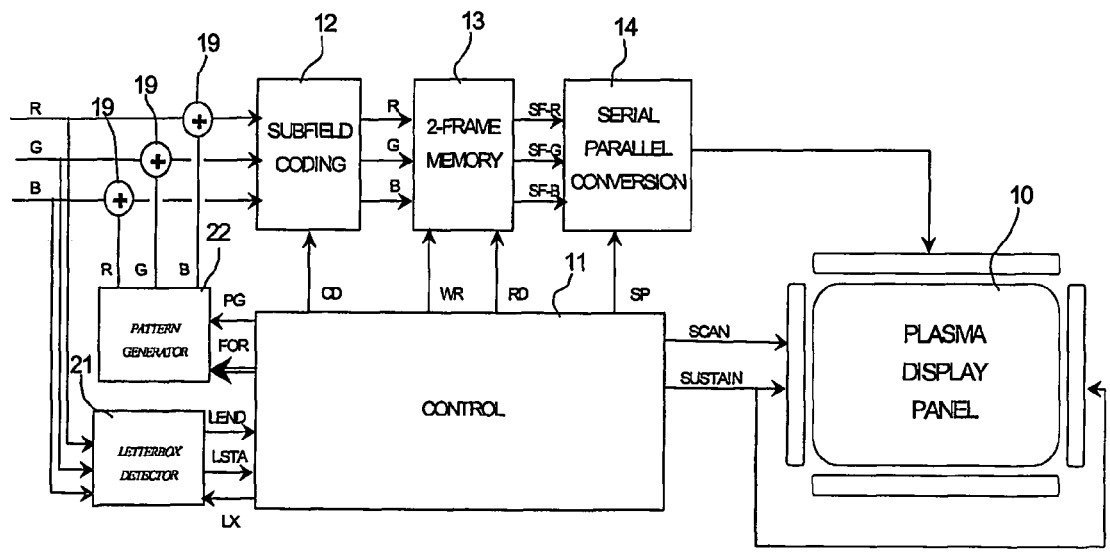
FIG. 20 shows a possible implementation of a "black-bars" ghost image pre-correction.

FIG. 20 presents a possible circuit implementation for the algorithms described in FIG. 17 and FIG. 18. Again, the reference numbers beeing identical to them shown in FIGS. 12 and 16 denote the same components and need not be explained again. The letterbox block 21 receives as input the incoming picture and is activated through the control signal LX by the control block 11. This block computes the first active line (LSTA) and last active line (LEND) of the incoming picture. Based on these data, the control block 11 is able to define the type of pattern which should replace or which should be added to the incoming picture. This pattern will be created in the pattern generator 22 with the format parameters FOR coming from the control block 11.

What is claimed is:

1. A method for compensating burn-in effects on a display screen, having a plurality of luminous cells corresponding to the color components of pixels of a video picture, and an input video value of a color component of a pixle is converted into a digital code word determining the length of the time period during which the corresponding luminous cell is activated, wherein to each bit of said digital code word, a sub-field consisting of a certain part of a frame period is assigned, and a bit entry associated with the sub-field determines whether the luminous cell is activated or deactivated for light output during the assigned sub-field, comprising the steps of:
   generating a wiper consisting of a geometrical area of the display screen for the cells being activated for light output;
   moving the wiper at least one time over the complete display screen or a part of the display screen; and
   using a sub-field organization for driving the luminous cells inside the wiper in which less sub-fields are present than in the sub-field organization used for displaying normal video pictures.

2. The method according to claim 1, wherein the wiper has the shape of a rectangle and particularly extends over the full size of the display screen in one of a vertical or horizontal direction.

3. The method according to claim 1, wherein the luminous cells are activated with the wiper with a power density that is higher than a predetermined power density for displaying a white picture on the display screen.

4. The method according to claim 1, wherein the wiper is selected in accordance with at least one of a predetermined picture or on an average picture representing an average of pictures displayed on the display screen before activating the wiper.

5. The method according to claim 4, wherein the wiper is based on a negative of at least one of a predetermined picture or the average picture.

6. The method according to claim 1, wherein the wiper is activated responsive to switching the display screen off or switching the display screen on.

7. The method according to claim 1, further comprising a step of computing a correction picture on the basis of at least one preceding picture already displayed on the display screen, combining the correction picture with a current picture and displaying the combined picture for reducing ghost images resulting from the at least one preceding picture.

8. The method according to claim 7, wherein the correction picture is one of a weighted negative of the at least one preceding picture and is added to the current picture for displaying or a weighted positive, and the correction picture is subtracted from the current picture for displaying.

9. The method according to claim 7, wherein the display format of the at least one previously displayed picture is determined and wherein the correction picture specifically has a correction in those areas where previously a black bar had been displayed resulting from the display format.

10. The method according to claim 9, wherein a letterbox detector is used for determining the display format of the at least one previously displayed picture in order to find the areas where previously a black bar had been displayed.

11. A display device having a plurality of luminous cells corresponding to the color components of pixels of a video picture, comprising:
   conversion means for converting an input video value of a color component of a pixel into a digital code word determining the length of the time period during which the corresponding luminous cell is activated, wherein to each bit of said digital code word, a sub-field consisting of a certain part of a frame period is assigned, and a bit entry associated with the sub-field determines whether the luminous cell is activated or deactivated for light output during the assigned sub-field, and
   a wiper generator for generating a video picture containing a wiper consisting of a geometrical area for driving a portion of the display screen in a manner that the characteristics of the display elements are homogenized and having included controlling means for activating the wiper generator and generating timing signals for moving said wiper at least one time over the complete display screen or a part of the display screen, wherein the wiper generator is adapted to activate the luminous cells inside the wiper for light output with a sub-field organization in which less sub-fields are present than in the sub-field organization used for displaying normal video pictures.

12. The display device according to claim 11, wherein the wiper has the shape of a rectangle and particularly extends over the frill display screen in one of a vertical or horizontal direction.

13. The display device according to claim 11, wherein the power density for displaying the wiper is higher than a predetermined power density of display signals for displaying a white picture on the display screen.

14. The display device according to claim 11 further including storing means for storing at least one of a predetermined picture or an average picture representing an average of pictures displayed on the display screen, the storing means supplying the stored picture to the wiper generator as a basis for the wiper generation.

15. The display device according to claim 14 further including inverting means for generating an inverted picture of at least one of the predetermined picture or the average picture.

16. The display device according to claim 15 wherein the storing means stores the inverted picture of at least one of the predetermined picture or the average picture.

17. The display device according to claim 11 including timing means for activating the wiper generator after one of switching the display screen off or switching the display screen on.

18. The display device according to claim 11, further comprising:
   computing means for computing a correction picture on the basis of at least one preceding picture already displayed on the display screen,
   combining means for combining the correction picture with a current picture and
   controlling means for driving the display screen to display the combined picture for reducing ghost images resulting from the at least one preceding picture.

19. The display device according to claim 18, wherein the computing means generates a weighted inverse of the at least one preceding picture as correction picture for combining with to the current picture for display.

20. The display device according to claim 18, including a letter box detector for computing the borders of the active picture area of the at least one preceding picture and wherein the computing means generates the correction picture on the basis of assigning a one of a value to the regions of pixels in the current picture that correspond to the region of non-active pixels in the at least one preceding picture.

* * * * *